United States Patent [19]

Bryant et al.

[11] 4,430,651

[45] Feb. 7, 1984

[54] EXPANDABLE AND CONTRACTIBLE LOCAL AREA NETWORK SYSTEM

[75] Inventors: David M. Bryant, Cardiff, Calif.; Ryn C. Corbeil, Bridgewater, N.J.; Michael A. Malcolm, Waterloo, Canada; Lawrence D. Rogers, Del Mar; Donald R. Thompson, San Diego, both of Calif.

[73] Assignee: Burroughs Corporation, Detroit, Mich.

[21] Appl. No.: 296,952

[22] Filed: Aug. 27, 1981

[51] Int. Cl.³ .............................................. H04Q 9/00
[52] U.S. Cl. .................................. 340/825.52; 370/94
[58] Field of Search ...................... 340/825.52, 825.21, 340/825.02, 825.03, 825.5; 370/60, 61, 94, 82; 178/3

[56] References Cited

U.S. PATENT DOCUMENTS

| | | | |
|---|---|---|---|
| 4,281,380 | 7/1981 | De Mesa et al. | 370/94 |
| 4,287,592 | 9/1981 | Paulish et al. | 370/94 |
| 4,332,027 | 5/1982 | Malcolm et al. | 370/94 |
| 4,347,498 | 8/1982 | Lee et al. | 340/825.02 |

Primary Examiner—Donald J. Yusko
Attorney, Agent, or Firm—J. Ronald Richbourg; Mervyn L. Young; Kevin R. Peterson

[57] ABSTRACT

This disclosure relates to a system and method for the synchronization of variable-length messages being transmitted between stations of a local area contention network where the messages are made up of a variable number of fixed-length packets. This system is adapted for automatic address assignment of different stations of the network so that the network may be expanded or contracted by adding stations and removing stations respectively. In this manner, a very reliable network is provided in that the failure of any particular station does not interfere with the functioning of the other stations in the network or the network itself. In addition, the system includes provision for associating various server stations with a given procedure so that a client station may broadcast a request for a procedure and corresponding server stations will send the response to the client station containing the network identification of the server station. If two or more stations contain the particular procedure called for, the first one to respond to the client station is selected.

10 Claims, 15 Drawing Figures

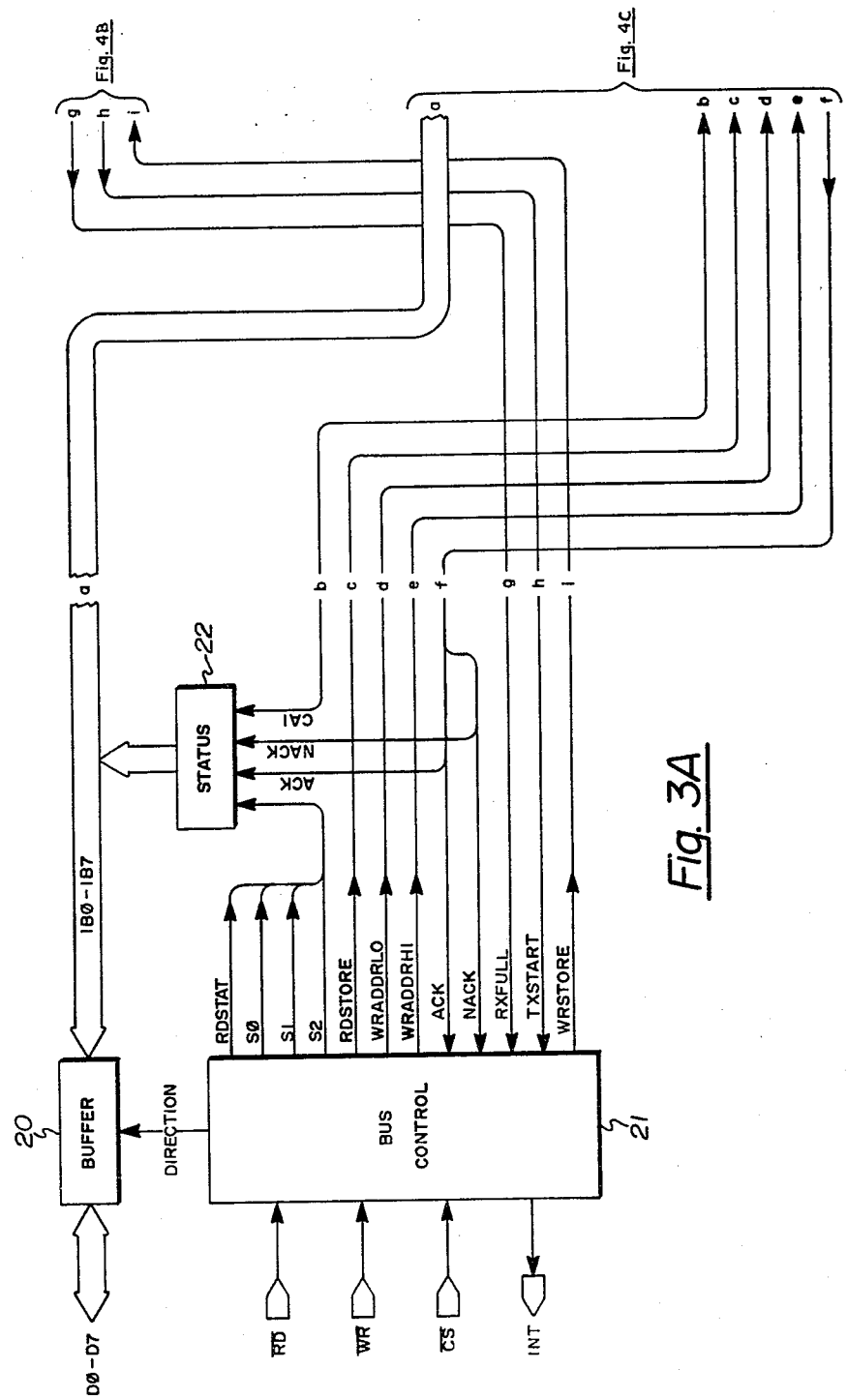

EXPANDABLE AND CONTRACTIBLE LOCAL AREA NETWORK SYSTEM

RELATED U.S. PATENT APPLICATIONS

U.S. patent applications directly or indirectly related to the subject application are the following:

Ser. No. 296,951, filed Aug. 17, 1981 by David M. Bryant, et al and titled System and Method for Synchronizing Variable-Length Messages in a Local Area Network Data Communication System; and Ser. No. 296,878, filed Aug. 27, 1981 by David M. Bryant, et al and titled System and Method for Name-Lookup in a Local Area Network Data Communication System.

BACKGROUND OF THE INVENTION

1. Field of the Invention

This invention relates to a local area network and more particularly to such a network that can be expanded or contracted.

2. Description of the Prior Art

Prior art networks of terminals or stations usually have been controlled by a master computer or controller which receives transmission requests from the respective stations and grants access to a transmission channel by the individual stations when the channel is available and according to some priority arrangement. Such master controllers add to the cost of the network and are not required where the stations need communicate only between themselves or with a common storage file. Thus, it is desirable to have a network of stations where the transmission control is embedded in or shared by the stations making up that network. Such networks are referred to as "local area" networks.

A particular type of local area network is the so-called "contention" network wherein each station of the network attempts to transmit a message when it is ready to do so and assumes that the message was not received if a corresponding acknowledgment signal is not received after a given period of time. Such a contention network is disclosed in the Malcolm et al U.S. Pat. No. 4,332,027, assigned to the assignee of the present invention.

With such local area networks, it is necessary to provide a communication protocol for the synchronization of message passage between stations of the network which may be adapted to provide different processes. However, no such protocol has yet been devised for the synchronization of the various processes which are distributed to different stations of the network.

Message passage operating systems have been employed for the synchronization of the various processes involved in central processing systems for real-time operation. (See, for example, "Thoth, a Portable Real-Time Operating System", by D. R. Cheriton, M. A. Malcolm, L. S. Melen, and G. R. Sager, CACM, Vol. 22, No. 2, February 1979, pp. 105-115.) However, all of the respective processes are stored in a common memory and the same type of system is not adaptable to a local area network where the processes are distributed across the network. Furthermore, it is desirable to be able to expand the local network or even to connect it to a larger global network and to do so without having to change the addresses of each station in the network.

It is then an object of the present invention to provide an improved communications protocol for local area networks.

It is another object of the invention to provide a protocol for a local area network of stations to allow for the transmission of messages between processes embodied in the different stations.

It is still another object of the present invention to provide for automatic assignment of addresses to various stations in a local area network so that the addition or removal of any station will not affect the operation of the rest of the stations.

SUMMARY OF THE INVENTION

In order to accomplish the above objects, the present invention is directed toward a plurality of client stations and a plurality of server stations in a local area network wherein each station, when it is ready to transmit, will then begin to transmit a fixed length packet of information. If an acknowledgment is not received from the receiver station during an acknowledgment period, then the sender will assume that there was an error in transmission or that the packet was not received and will attempt to transmit again at a later time. However, stations may be added or removed from the network and this should be accomplished without affecting operations of the remaining stations in the network.

It is then a feature of the present invention to provide a system for the transmission of messages between stations of a local area network without regard as to whether any particular station resides in the network.

BRIEF DESCRIPTION OF THE DRAWINGS

The above objects, advantages and features of the present invention will become more readily apparent from a review of the following specification taken in conjunction with the drawings wherein:

FIGS. 3A, 3B and 3C are schematic diagrams illustrating the station interface of the present invention;

GENERAL DESCRIPTION OF THE INVENTION

The above objects, advantages and features of the present invention indicate that the present invention is directed toward a network of nodes or a station which is not host centered. As a result, a much more reliable network is obtained since the failure of any particular station will not disrupt the network. In addition, additional stations may be added and existing stations may be removed without disrupting the function of the other stations in the network. In general, there are two types of stations: server stations such as a file system, mass storage device, or printer; and client stations such as a display station or terminal which does not provide services to the rest of the network but merely serves to input information and request information back, perhaps altered. In addition, the present invention is directed toward synchronization of messages between stations even though such messages may consist of a variable number of information packets.

Figure 1:
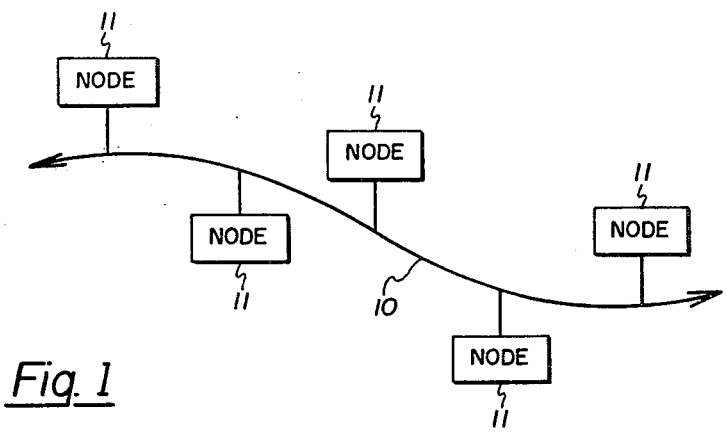
FIG. 1 is a diagram of a local area network of the present invention.

A local area contention network in which the present invention may be employed is disclosed in the above-referenced Malcolm et al patent and is illustrated generally in FIG. 1. The shared communication medium can be a twisted pair, a coaxial cable, fiber optics or even radio communication and so forth. Each station of the network transmits packets independently of the other nodes, possibly interfering or colliding with other transmissions. If the transmitted packet is received correctly by the destination station, then the receiver responds with an acknowledgment signal. If the acknowledgment signal is not received by the transmitting station during the acknowledgment period following the packet transmission, then the transmitter assumes that the transmission was unsuccessful.

Figure 2:
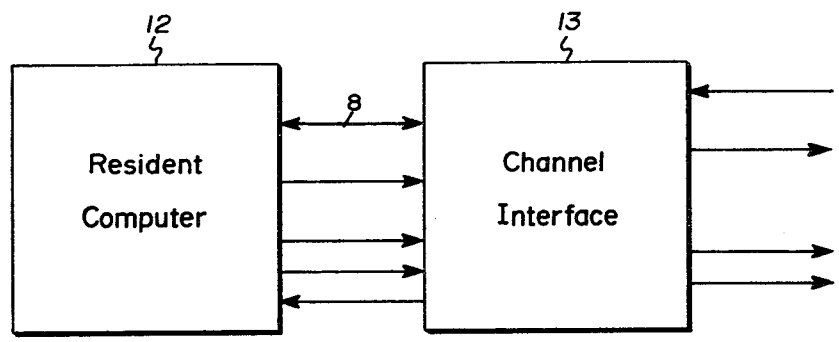
FIG. 2 is a schematic diagram of a processor and its interface to the channel medium as employed in the present invention.

The organization of a station employing the present invention is illustrated generally in FIG. 2 and consists of a processor 12 which services the station and an interface 13 which connects the processor to the channel of the present invention, whatever the channel medium might be.

Each local network is viewed as a rooted tree of named nodes. Each node has a name that must be different from the names of sibling nodes. The network hardware is viewed as the root node of the network tree. Each uniquely named server station in the network is an immediate descendant of the root node. File storage server stations appear as subtrees, where each file or directory is a node. Client stations do not have names because other stations do not refer to them.

Other local networks in a global network are viewed as separate trees. That is, the global network is a forest of trees, where each tree root has a unique name. A program process or user refers to a particular node in the network using a "pathname" that describes a path through a tree starting at a root node and ending at the desired object.

The local network information transfer protocol is divided into two layers: the packet protocol, and the message protocol. The message protocol uses the packet protocol to deliver packets. In addition, all control packets are delivered using the packet protocol.

The message passing procedures, Send, Receive, Reply, and Await Sender are employed for the actual message passing. These procedures are implemented by the packet protocol and employ four types of control packets: request-to-send, clear-to-send, obituary, and are-you-there. These functions and operations are more fully discussed below along with the name-lookup routine and the automatic address assignment, which are employed with the present invention. The name-lookup routine allows a station having a given procedure to respond to another station's request for that procedure by returning its own physical address for further message transmission. The automatic address assignment allows a station to select an address for itself and verify that that address is unique and not employed by any of the other stations in the network.

DETAILED DESCRIPTION OF THE INVENTION

A resident computer 12 of FIG. 2 in each station is coupled to the channel by the interface 13. Received packets and packets to be transmitted are transferred between the interface and resident computer across a single-byte input/output port P, as described below. An interrupt request signal and two reset signals complete the interface to the resident computer. Operations that can be performed on the interface are Reset, Read Status, Load Packet, and Unload Packet.

Figure 3B:
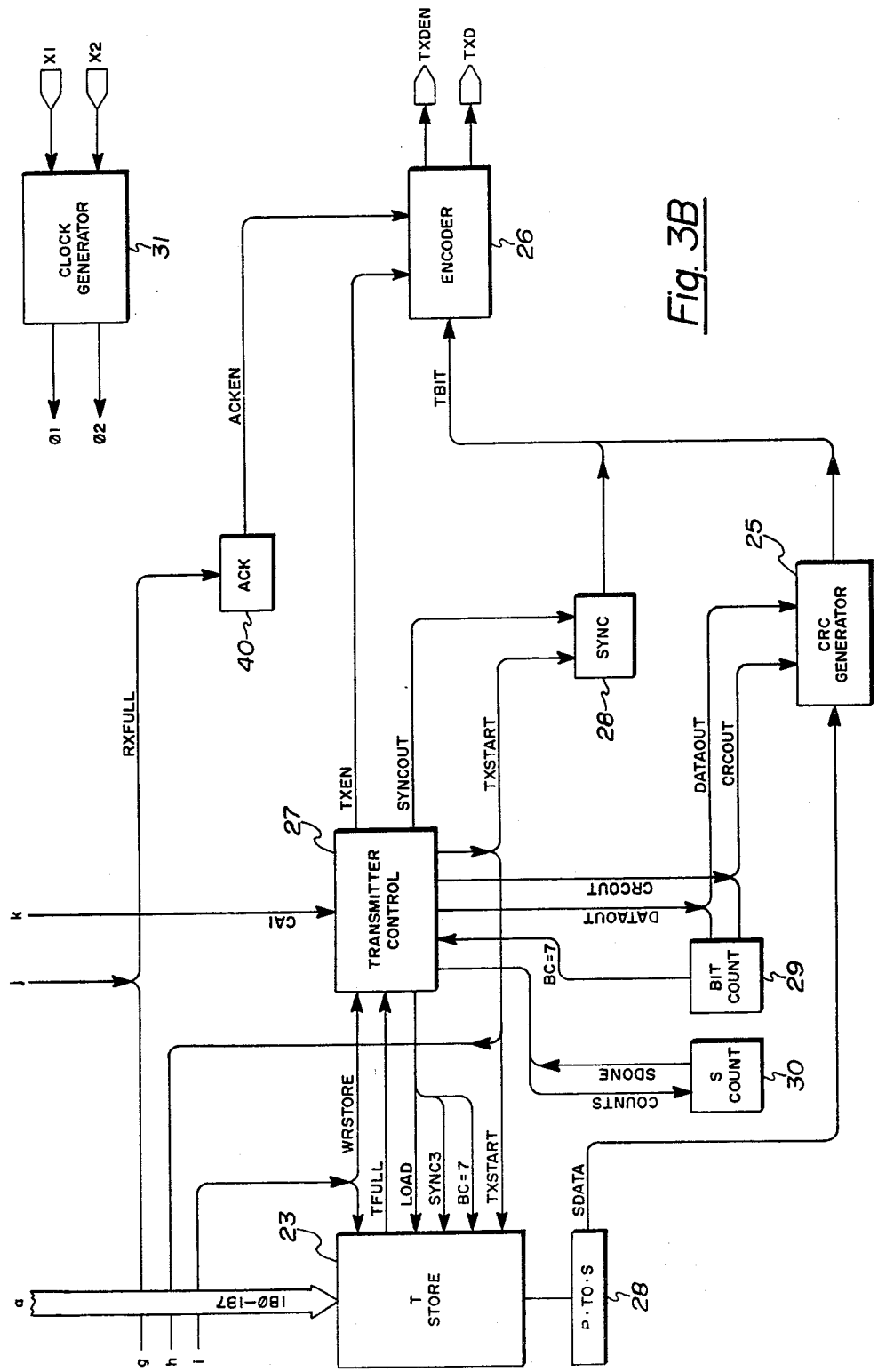
Figure 3C:
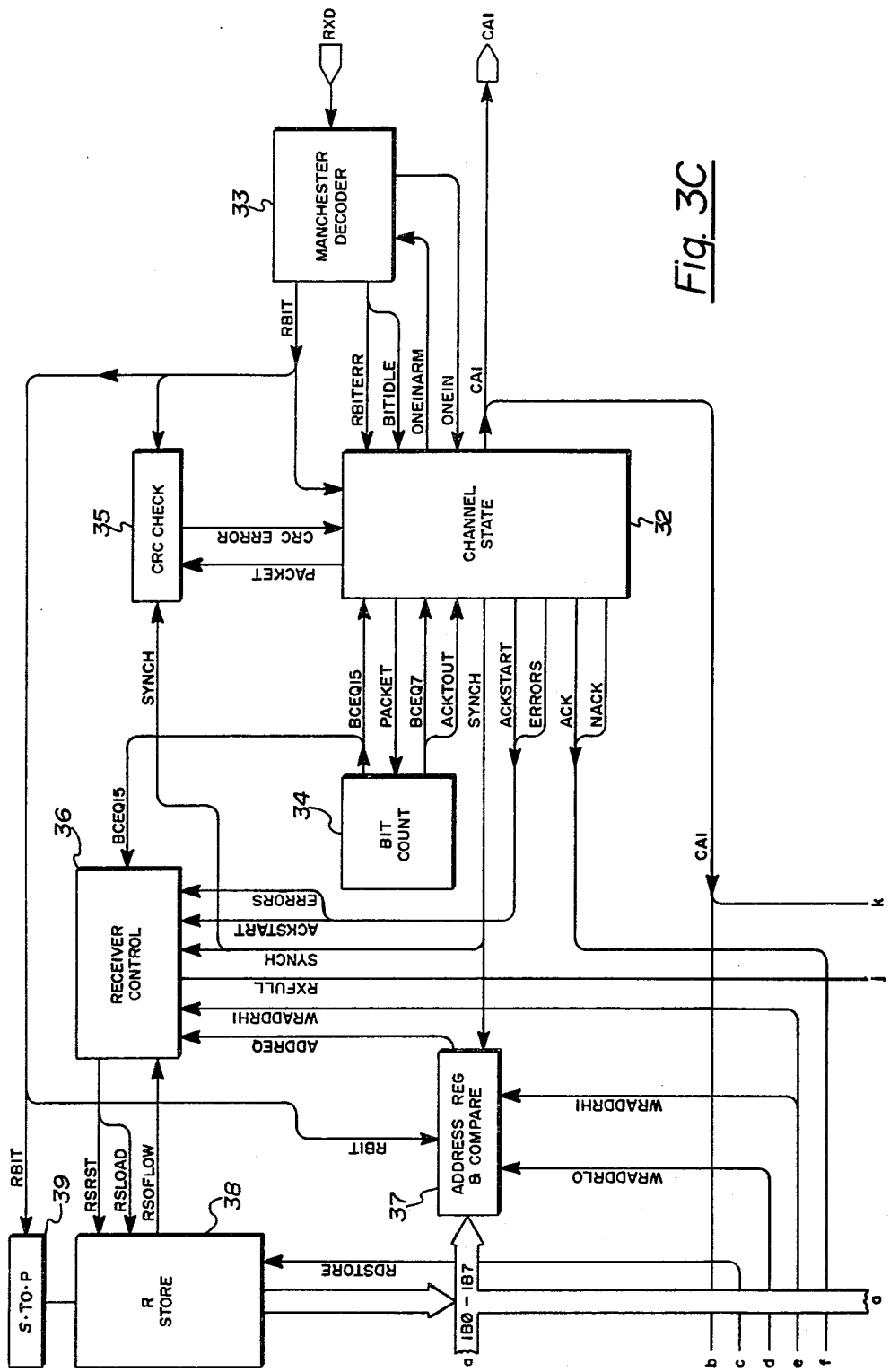

The interface 13 of FIG. 2 between the resident computer 12 and the channel is illustrated in FIGS. 3A, 3B and 3C. The interface communicates with the resident computer through a set of signals consisting of read $\overline{RD}$, write $\overline{WR}$, circuit select $\overline{CS}$, interrupt request $\overline{INT}$, and an 8-bit data bus. The transmitter loads packets from the resident computer and transmits them over the channel according to the transmission algorithm described above. The receiver receives packets from the channel and unloads them to the resident computer. The tasks of CRC generation and checking, line monitoring and data encoding are done by the interface and not by the resident computer. Since the receiver and transmitter are independent, they can both be active at the same time, as when the transmitter is sending a packet while the receiver is unloading a different packet to the resident computer.

In FIG. 3A, data is transferred between the resident computer and interface by way of port P which comprises buffer 20 and bus control 21. Data bus buffer 20 is a bi-directional buffer for the 8 data signals which comprise the input/output port P. The data transfer depends upon the states of the read $\overline{RD}$, write $\overline{WR}$, and circuit select $\overline{CS}$ signals to the bus control 21.

Status register 22 contains bits to indicate the state of the interface and the channel in the following manner:

| Bit | Status |
| --- | --- |
| 0 | Transmission complete, ACK received (reset when status byte is read) |
| 1 | Transmission complete, no ACK received (reset when status byte is read) |
| 2 | Correct packet received (reset when status byte is read) |
| 3 | Not used |
| 4 | Not used |
| 5 | Channel activity indicator (1 when channel is busy; 0 when channel is idle) |
| 6 | An ACK signal was detected on the channel, indicating a good packet transmission (reset when status byte is read) |
| 7 | Bad data on channel. A bad packet, a collision, or noise was detected on the channel (reset when status byte is read) |

Bus control 21 responds to the $\overline{RD}$ and $\overline{CS}$ signals with a read operation and the $\overline{WR}$ and $\overline{CS}$ signals with a write operation. Bus control 21 maintains a simple state machine to determine the source (or destination) of the read or write operations. Possible sources of read data are status register 22 and receiver store 38. Destinations for written data are address register 37 and transmitter store 23.

In FIG. 3B, transmitter store 23 holds a packet of data to be transmitted. It is a FIFO store of 134 bytes (132 for data and 2 for the destination address). Data to be transmitted leaves the transmitter store 23 by way of parallel-to-serial buffer 24. Data transmission is controlled by transmitter control 27 which initiates a packet transmission employing the transmission algorithm described above and in accordance with the value from S count unit 30. S count unit 30 is comprised of a counter driven by a random clock (neither of which is shown). Transmitter control 27 also synchronizes the other parts of the transmitter to ensure packet transmission.

CRC generator 25 builds the CRC code of the packet being transmitted at the same time that data in transmitter store 23 is being transmitted. When transmitter store 23 becomes empty, the resultant CRC is transmitted. As was indicated above, the first field of the packet is a 4 bit SYNC code which is generated by SYNC generator 28.

The packet being transmitted passes through encoder 26 which encodes each bit in a Manchester code before transmission. The four sources of data to be transmitted (as indicated above) are the SYNC code 28, the transmitter store 23 (for destination address and data), the CRC generator 25, and the acknowledgment code 40. The output select decides which of these, if any, is to be sent.

As was indicated above, the three possible channel states (idle, packet-being-transmitted, and acknowledgment period) are maintained in channel state 32 of FIG. 3C for use by both the transmitter and receiver. A timer is required for each change of state. A timer is also used by the transmitter in the delay portion of the transmission algorithm as described above. Input decoder 33 is a Manchester decoder which receives data from the channel. It thus converts the Manchester encoded data into unencoded data. The SYNC code can also be recognized at this point and separated from the data. CRC check 35 is the opposite of the CRC generator 25 and serves to verify the correctness of the incoming data.

Receiver store 38 buffers a packet received from the channel to be read by the resident computer. The data enters the receiver store 38 by way of serial-to-parallel buffer 39. Receiver control 36 synchronizes the parts of the receiver in an order to ensure correct packet reception.

On Reset, the interface is loaded from the resident computer with its address. Thereafter, when a packet is detected on the channel, and receiver store 38 is empty, address compare logic 37 checks to see if the packet is intended for the resident computer by comparing the incoming address against the stored address.

Manchester encoding is employed to send data with an embedded clock and no DC bias. It is characterized by always having a transition during the middle of a bit interval. A logic zero is a positive going transition while a logic one is a negative going transition.

Resident computer 12 of FIG. 2 is of a type that is commercially availale, such as an Intel 8086 or a Zilog Z80. Such an Intel processor is indicated generally in FIG. 4. The execution unit includes arithmetic logic unit 40, general registers 41, temporary registers 42, flag registers 43, as well as the execution control unit system 44. Such a control system is microcode-driven by a control store which may be a ROM, EAROM, or RAM. The computer interface unit to channel interface 13 of FIG. 2 includes bus control logic 45, instruction queue 46, internal communications registers 47, as well as an output summer 48 for the latter registers. Such a microcoded processor is employed to interpret the control programs of the present invention as will be more thoroughly described below.

Figure 4:
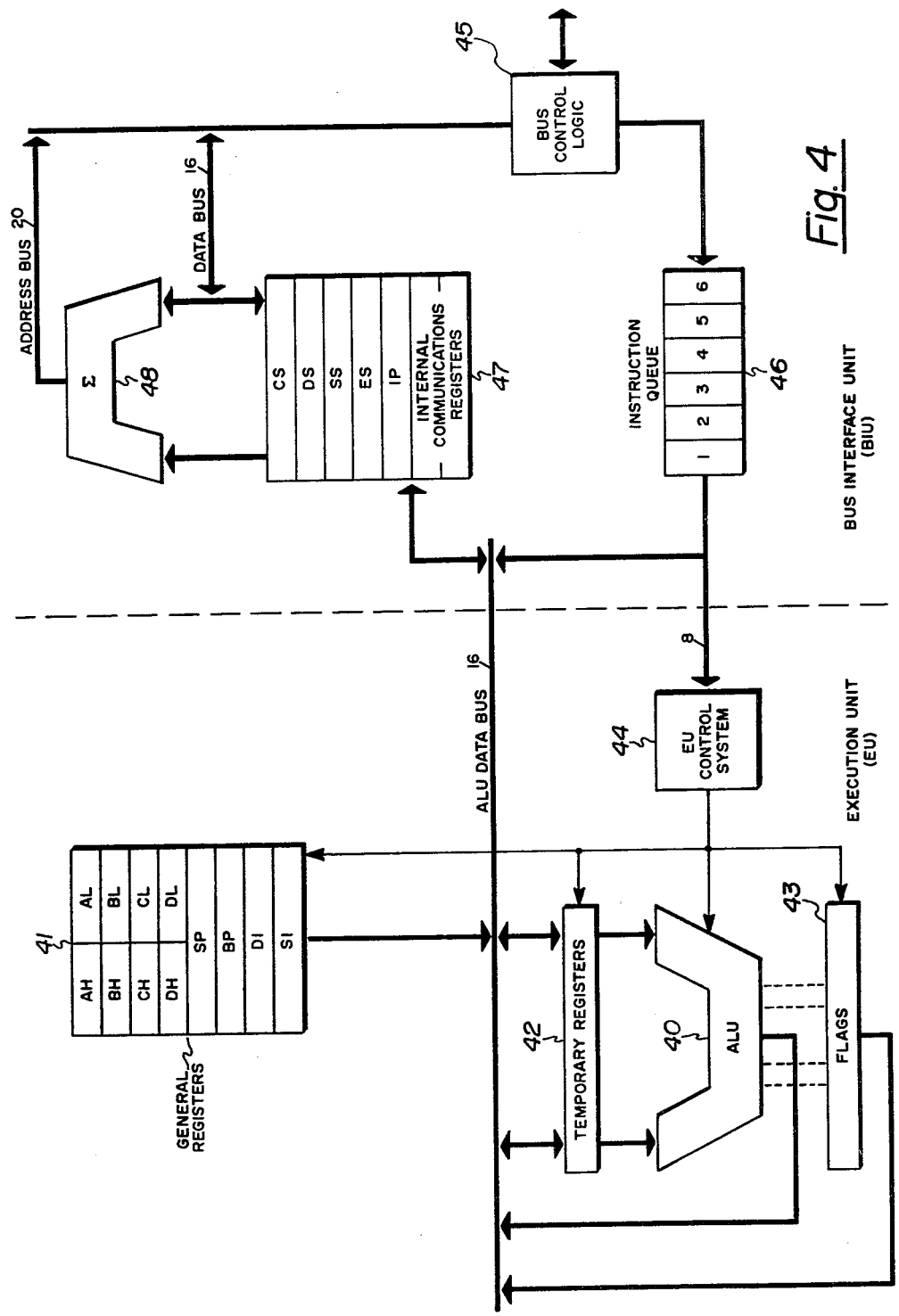
FIG. 4 is a schematic diagram of the processor controlling a station of the present invention.

The channel state machine for each node in the present invention is illustrated in FIG. 4. As indicated therein, the network channel cycles sequentially through three states: idle, packet-being-transmitted, and acknowledgement. Each station continually monitors the channel and keeps track of its state. Because there will be a propagation delay for the signals, the exact times of transmissions between the stations vary from point to point along the network but they all are synchronized within a fixed time interval.

Figure 5A:
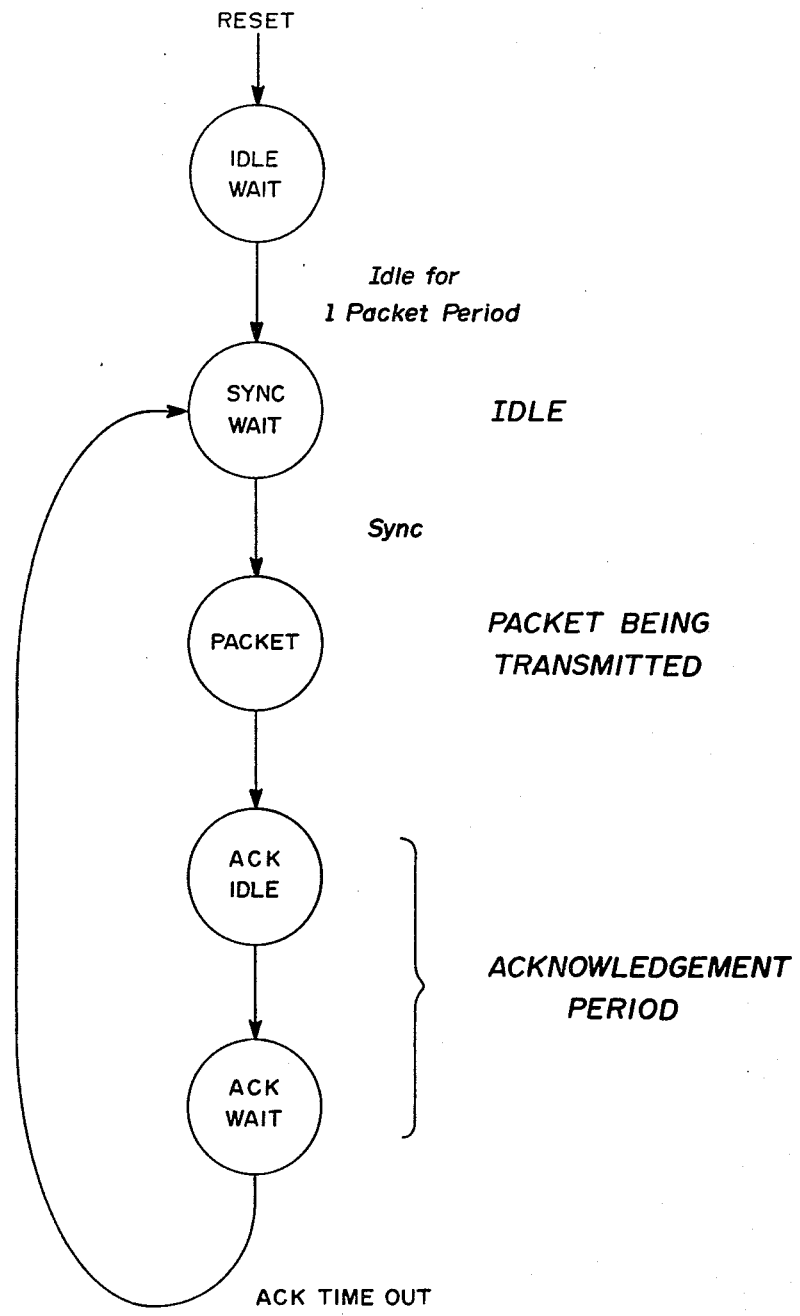
FIGS. 5A and 5B are diagrams of the channel state machine and transmission method as employed by the present invention.
Figure 5B:
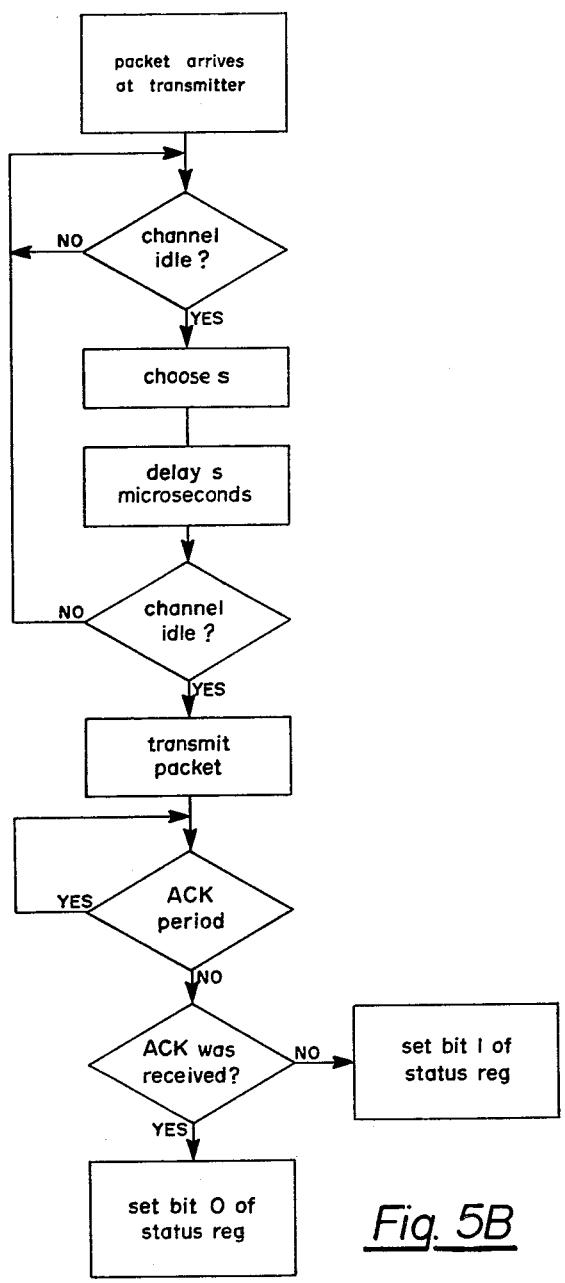

Upon reset or power-up, the channel state machine enters the SYNC WAIT state after the channel has been quiescent for at least one packet transmission. Upon detection of any data on the channel, the channel state machine enters the PACKET state which lasts a fixed amount of time. After the PACKET state, the channel state machine enters the ACK IDLE state followed by the ACK WAIT state, each of fixed duration. After the ACK WAIT state, the channel state machine returns to the SYNC WAIT state. When a packet to be transmitted is loaded into the interface of a particular node, the interface operates in the manner illustrated in FIG. 5B.

Step 1.
Upon arrival of a packet to be transmitted, the interface checks to see if the channel is idle. If the channel is either in the packet-being-transmitted state or the acknowledgment state, then the transmitter waits until the channel becomes idle.

Step 2.
An arbitrary integer s is chosen randomly in the interval [O,S] with each of the S+1 possible choices being equally probable. The transmitter then delays for s microseconds. If the channel is still idle at the end of the delay, then the packet is transmitted. If at that time the channel is not idle, then the transmitter goes back to Step 1.

Step 3.
The transmitter waits for the acknowledgment to complete. It then sets the interface status register according to whether or not an acknowledgment signal was received during the acknowledgment period. The setting of the status register causes an interrupt request of the resident computer.

The network system transmits a packet and reports to the control via the status register whether or not an acknowledgment is received. If an acknowledgment is received, the system guarantees that the packet was delivered correctly to the destination station. If no acknowledgment is received, there is a reasonably high probability that the packet was not delivered; the usual reason for a packet transmission being unsuccessful is that two packets collide, or the destination station's receiver buffer is not empty. However, there is a small probability that the destination station receives the packet and sends an acknowledgment, but the acknowledgment is not received by the transmitting station.

The packet protocol simply retransmits a packet, if necessary, until an acknowledgment is received. Up to $N-1$ retransmissions are performed. When a packet is delivered by the packet protocol, the delivery is "successful" if an acknowledgment is received. The delivery is "unsuccessful" if none of the N packet transmissions receives an acknowledgment. It is assumed that the destination station does not exist (or has failed) if a delivery to it is unsuccessful.

A packet transmitted to a station with a full receiver buffer does not receive an acknowledgment. If the packet is retransmitted immediately, there is a good probability that the buffer is still full. The fact that the receiver buffer is full may also be an indication the receiver is congested; i.e., it is receiving packets at a higher rate than it can handle. To increase the probability of a successful retransmission, and to avoid congestion, a station "backs off" by waiting before each retransmission.

A packet with the broadcast destination address is received by all stations with empty receiver buffers. The system acknowledgment is meaningless in this case. To ensure that all stations receive the packet, it is transmitted N times, using the same backoff method as non-broadcast packet deliveries. Delivery of a broadcast packet is always considered successful.

If a delivery is successful, it is possible that the receiving station(s) received more than one copy of the packet. Thus, viewing each packet as causing an operation to be performed by the receiving station(s), these operations are restricted to being idempotent. The effect of doing an "idempotent operation" multiple times in succession is the same as that of doing the operation once. An example of an idempotent operation is storing a byte into a memory location; performing the operation twice has the same effect as performing it once. All of the packet delivered by the packet protocol have been designed to invoke idempotent operations.

Figure 6:
FIG. 6 is a diagram of the information packet format as employed in the present invention.

Every packet has the format shown in FIG. 6, which packet contains the following fields:

| byte(s) | contents |
|---------|----------|
| 1-6 | destination process network identification (nid) |
| 7-12 | source process network identification (nid) |
| 13 | packet type |
| 14 | length of data in bytes and sequence bit |
| 15-134 | data |

Packet types and their encoded values are:

| code | packet type |
|------|-------------|
| 1 | data |
| 2 | obituary |
| 3 | request-to-send |
| 4 | clear-to-send |
| 5 | are-you-there |
| 6 | name-lookup-request |
| 7 | name-lookup-response |
| 8 | claim |

Assigning Network Identification (NIDS) to Processes

The network protocol is a process-to-process protocol. All data sent over the network are originated by a process and are sent to a process. A process must perform network activities sequentially. Each activity must complete before another activity can be initiated. A station may contain multiple processes; in which case, network activities associated with different processes can occur concurrently. New processes may be created, and existing processes may be destroyed at any time.

A process is identified by a 48-bit network identification. A network identification consists of a 16-bit station address, a 16-bit station generation number, and a 16-bit process identification. This network identification is unique within the local network.

Each station in the network has a unique 16-bit address. The address of the station determines the address portion of the network identification for each process in the station. The 16-bit station address space is partitioned as shown below.

An address partition has been set aside for dynamic address stations that automatically choose an unused address each time they are started.

| Station Address Partitions | |
|---|---|
| address range (hexadecimal) | use |
| 0000 | reserved as an invalid address |
| 0001 | reserved for initialization |
| 2-3FFF | station addresses |
| 4000-7FFF | address assignment procedure |
| 8000-FFFF | broadcast addresses - not available for station addresses |

A station that is restarted may assume the same address. It is also possible for the station to assign the same process identification to processes running in it. These reincarnated processes need to be assigned different network identifications from their previous incarnations so that processes in other stations can distinguish between them and the previous incarnations. To solve this problem, a restarted station chooses a 16-bit "generation number" that becomes part of the network identification of each process in that station. Ideally, the generation number should never have been used before by that station. Clearly this is impossible to guarantee in general because some generation number must be reused after $2^{16}$ restarts.

The method of choosing generation numbers is implementation-dependent, but should minimize the probability of reusing a recently used generation number. The generation number may be kept in an EAROM or other nonvolatile store and incremented each restart. Implementations that do not have access to the EAROM may use a random generation number.

It is the responsibility of the control in each station to assign process identifications unique within that station (including destroyed processes). Since there are only $2^{16}$ process identifications, these may have to be reused. Every implementation must minimize the possibility of reusing a recently used process identification. The process identification zero is reserved, and may never be assigned.

Automatic Address Assignment

Addresses are assigned automatically in the range (2, 3FFF). Addresses (4000, 7FFF) are reserved for the use of the address assignment procedure. When a station is initialized it automatically selects its own address as follows:

Step 1.
Choose a random number A in the range (2, 3FFF) as a potential address. Set the station address to A+4000. Choose a random number R in the range (1, X) where X is large enough to ensure that the chance of two terminals choosing the same A and R is negligible.

Repeat steps 2 and 3 using the backoff packet delivery algorithm until N packets have been delivered.

Step 2.
Send a claim packet to address A. If A acknowledges, then start again at Step 1.

Step 3.

Send a claim packet containing the random number R to address A+N. This is a broadcast delivery to ignore acknowledgments. If a packet is received for address A+N with a number different from R, start again at Step 1.

Step 4.
Set the station address to address A. The time required to do this is unbounded but is usually very short. If the time to reset is greater than one packet transmission time including backoff time, then abort the reset and start again at Step 1.

It can be determined how low the reset takes by attempting to transmit a packet right after initiating the reset. If the packet has not been transmitted, it can assume the reset is not complete.

Step 5.
Address A is now assumed.

Message Passing Functions

The four procedures, Send, Receive, Reply, and Await-Sender are available for message passing. The syntax of the following operations is intended only for illustrative purposes.

A sending process calls
Send(nid, send msg:replay msg) to send the send msg string to the receiving process specified by nid.
The nid vector has the following fields:
nid[ADDR]   station address
nid[GEN]    generation number
nid[ID]     process id The sending process blocks, (i.e., cannot proceed), until the receiving process has received the message and returned a reply message using the Reply function. The reply message is stored in the reply msg string, and the length of the reply is the new current length of the string.

The receiving process calls
Receive(nid:msg)
to receive a msg string from the sending process specified by nid. The message is transferred from the sender's send msg string to the receiver's msg string. The number of bytes transferred is the minimum of the current length of the sender's send msg string and the maximum length of the receiver's msg string. The actual number of bytes transferred becomes the current length of the receiver's msg string.

A process that has previously received a message using Receive may call
Reply(nid, msg)
to return a reply msg to the sending process. The replay is transferred from the msg string passed to Reply to the reply msg string passed to Send by the sender. The number of bytes transferred is the minimum of the current length of the msg string passed to Reply and the maximum length of the sender's reply msg string. The actual number of bytes transferred becomes the current length of the sender's reply msg string.

The procedures Send, Receive, and Reply each return a Boolean value. The returned value is 1 if the function invocation is successful; it is 0 if the function invocation is unsuccessful.

If a call to Send, Receive, or Reply is unsuccessful, the process specified by nid does not exist. The destination process may not exist for one or more of the following reasons.
—There does not exist a station with address nid[ADDR].
—The station with address nid[ADDR] does not have generation number nid[GEN].
—There does not exist a process with id nid[ID] within the station nid[ADDR].
—Either the station with address nid[ADDR] fails, or its process with id nid[ID] is destroyed before the function is complete.

It is often desirable to receive from any sender. The receiving process can call
sender-nid:=Await-sender()
to obtain the nid of a process that is trying to send to it. The receiving process can then perform a Receive from that sending process.

Message Protocol

The message-passing operations are implemented in terms of the packet protocol. Each message is sent as a sequence of one or more message data packets. Four types of control packets are used to implement the message passing: request-to-send, clear-to-send, obituary, and are-you-there.

Two timing parameters are used; they are denoted
w   wait timeout
h   handshake timeout Message data are not queued in system buffers. When a process executes Send, the data remain in the sender's msg string until the receiver has executed Receive. In the meantime, the sending process delivers a request-to-send packet (RTS) to the receiving process every h seconds. When the receiver has received an RTS, and has executed Receive, it delivers a clear-to-send packet (CTS) to the sending process. (This would require a station to remember all processes from which an RTS packet has been received. The minimum requirement is that the station remember the last RTS received for each process in the station. If this causes an RTS to be forgotten, the receiving process may have to wait until the next RTS is received.) Upon receiving the CTS, the sending process delivers the data packets and then waits until a reply message is returned by the receiving process. When the receiver executes Reply, the data in the receiver's msg string are sent to the sender in a sequence of data packets.

At any point in time either the sender or the receiver could cease to exist, assuming they both existed initially. It may be discovered on any packet delivery that the other process does not exist: either the delivery is unsuccessful, or an obituary packet is returned. The sending process delivers an are-you-there inquiry (AYT) packet every h seconds after delivering the data packets and before receiving the reply message. The purpose of the AYT inquiry is to discover if the receiver ceases to exist before executing Reply. Similarly, if a process executes Receive before the sender executes Send, the receiver delivers an AYT every h seconds while waiting to receiver an RTS.

Once a process begins sending a message as a sequence of data packets during either Send or Reply, it must deliver each successive packet no more than w seconds after the previous packet; otherwise the process receiving the packets assume the sending process has failed.

The end of a sequence of data packets is indicated by a data packet that contains less than the maximum number of data bytes. The data packets are idempotent because an alternating sequence bit is included in each packet. If a station receives two identical data packets, the second one is discarded.

Figure 7A:
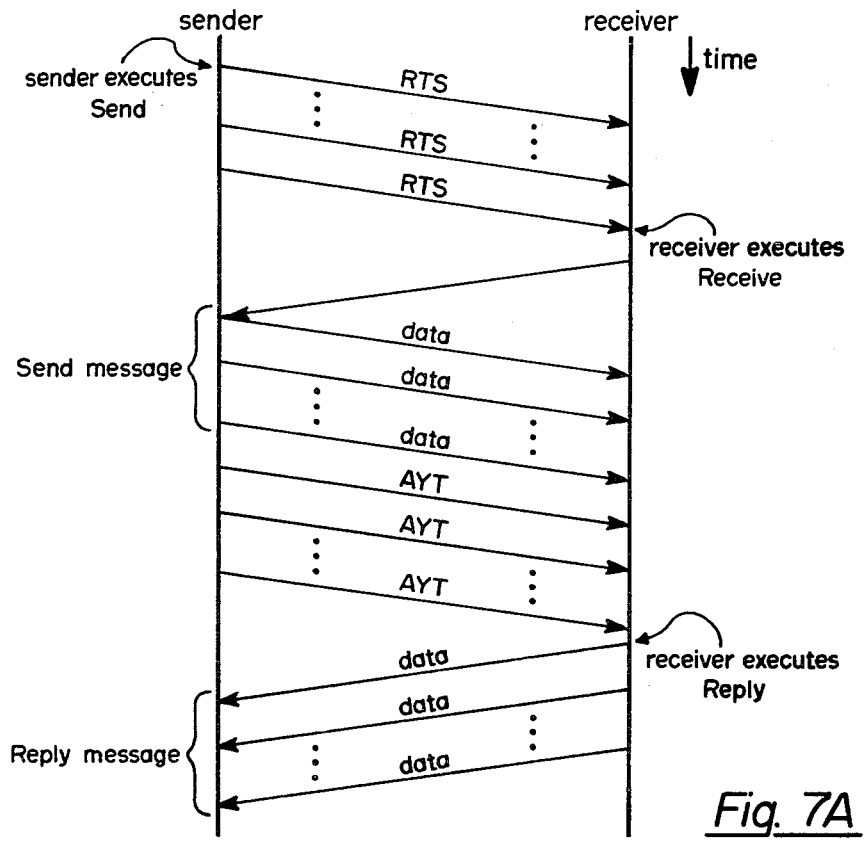
FIGS. 7A and 7B are diagrams illustrating the sequence of packet transmissions between a sender station and a receiver station.
Figure 7B:
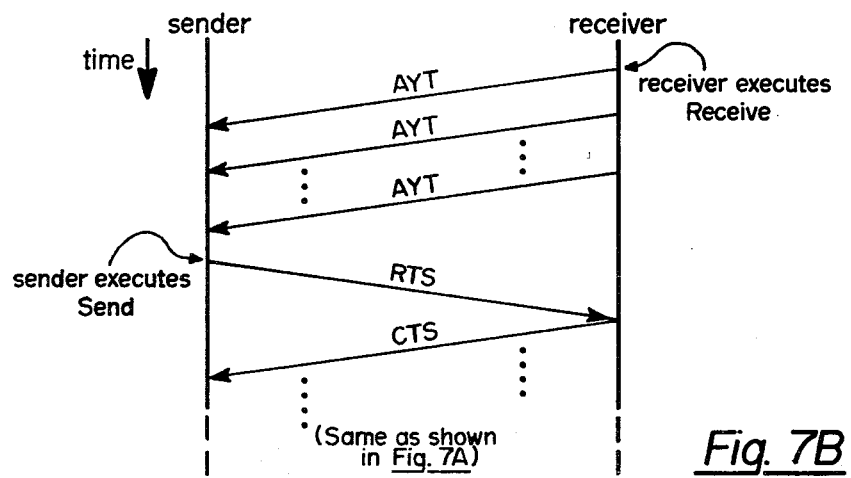
Figure 8A:
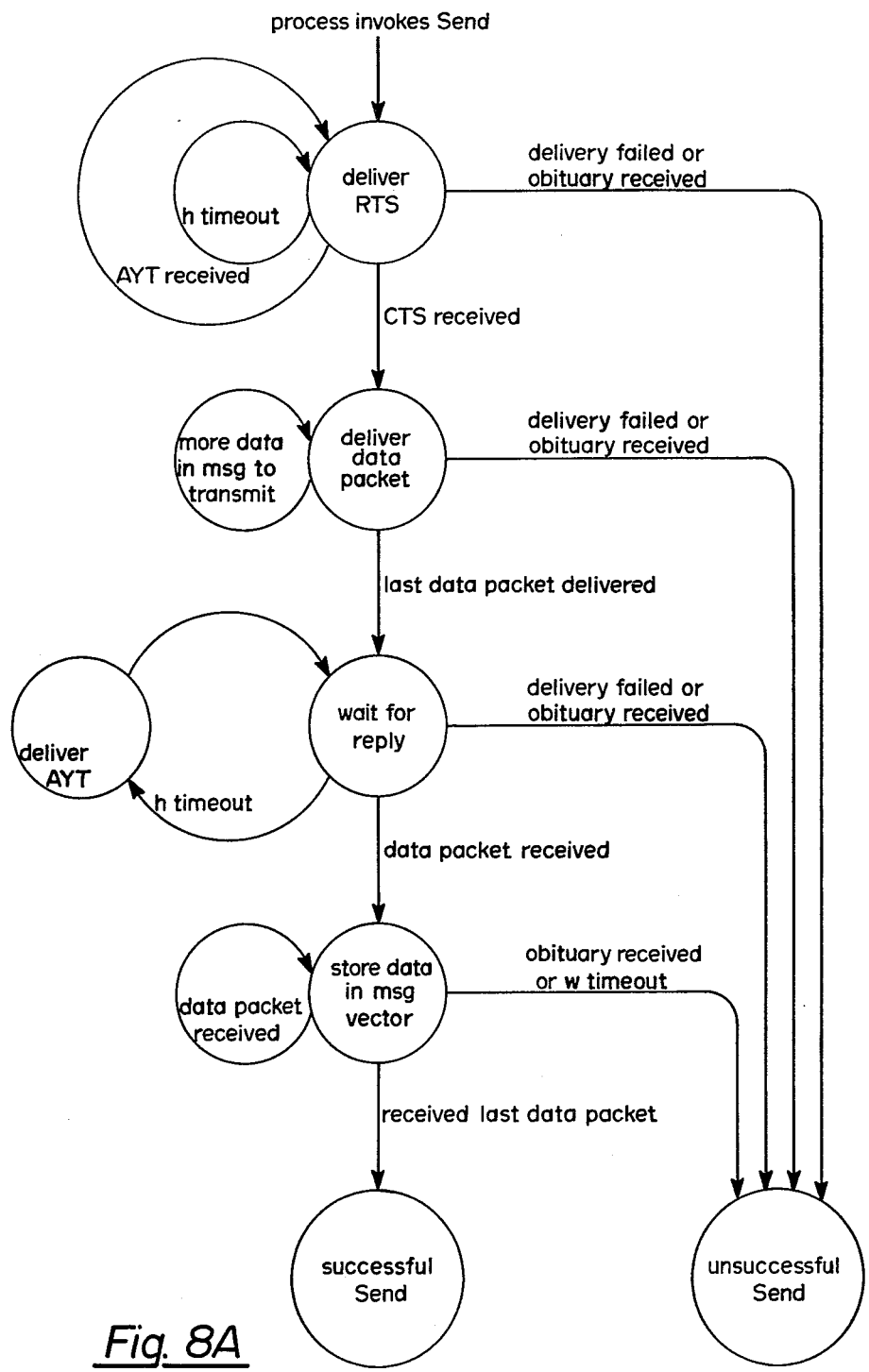
FIGS. 8A, 8B and 8C are flow diagrams illustrating the send function state machine, receive function state machine, and reply function state machine respectively as employed in the present invention.
Figure 8B:
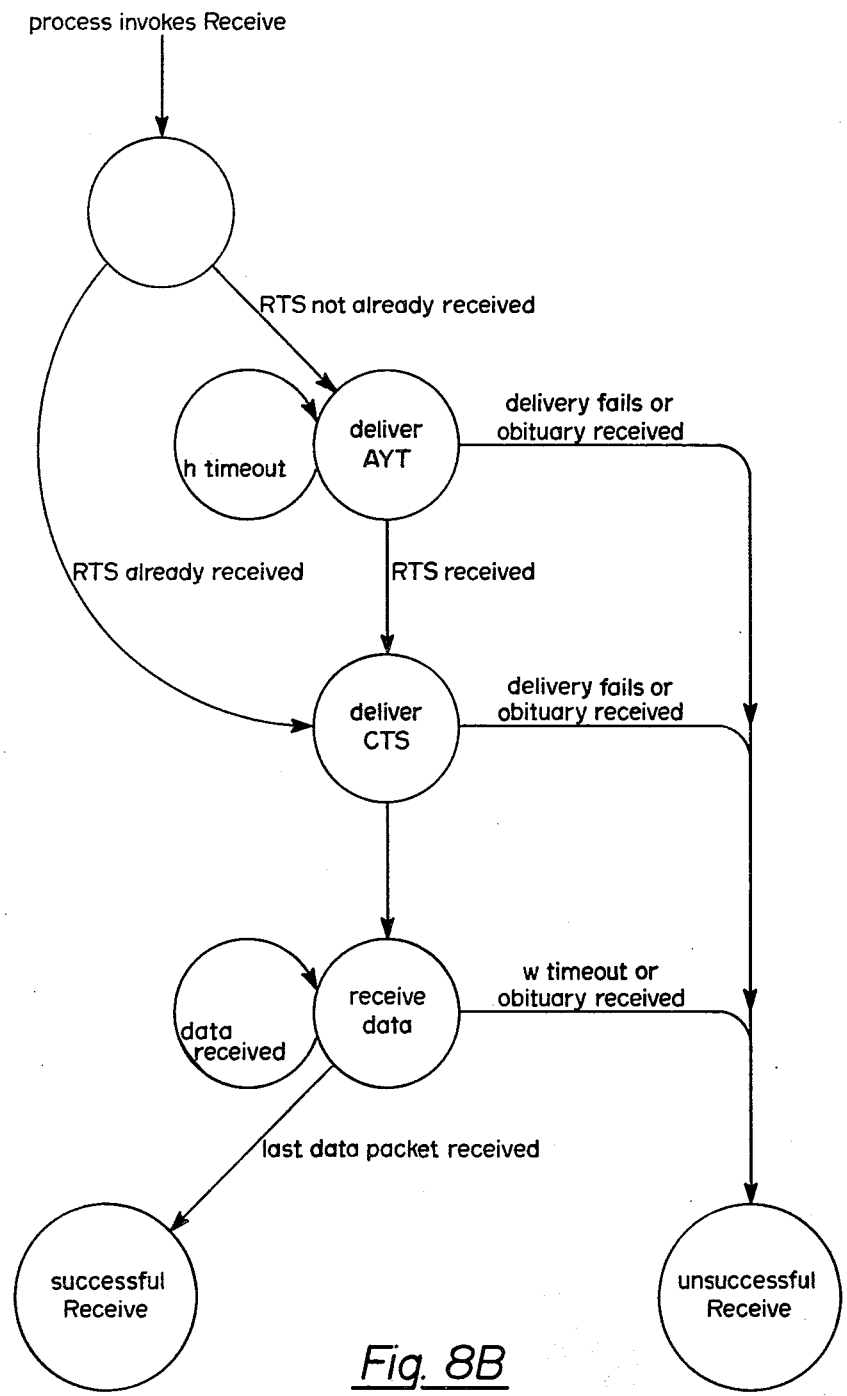
Figure 8C:
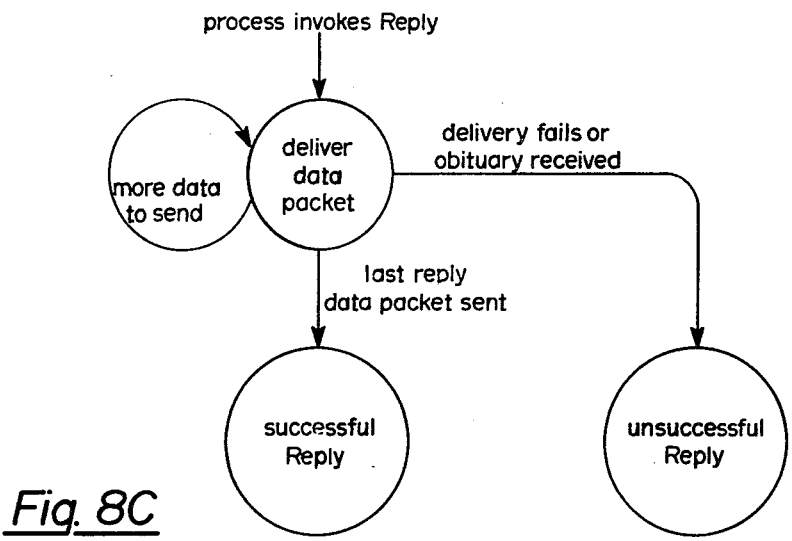

The sequence of control and data packets used to implement message passing is illustrated in FIGS. 7A and 7B. The state machines used to implement Send, Receive, and Reply are given in FIGS. 8A, 8B, and 8C respectively.

If a station receives a packet addressed to a nonexistent process, it normally delivers an obituary to the process that sent the packet. If it is temporarily unable to deliver an obituary (e.g., owing to lack of buffers), it may simply discard the packet. If the process that delivered the packet continues to deliver packets to the nonexistent process, it eventually receives an obituary packet. If a process receives a packet not specified in the state machine, it is ignored.

Name Lookup

Each server station has one or more names. More precisely, an application process within a server station may become associated with a network station name by calling the procedure Register(node_name);

where node_name is a string of 1 to 32 characters representing the name of server station node. For example, a process A could call Register('fsmO');

to inform the network control that references to the pathname */fsmO are actually references to the process A.

A process can call the procedure code:=Name_lookup(station_pathname:nid);

to determine the nid of the process associated with station_pathname. The pathname of a station consists of the node name of the network, followed by the node name of the station. (The variable station-pathname is a string of from 3 to 65 characters.) If a process with that name exists, the associated nid is returned in nid vector, and code is 1. If a process with that name does not exist, code is 0. In the above example, code:=Name_lookup('*/fmsO':nid);

returns code=1, and the nid of process A.

Figure 9:
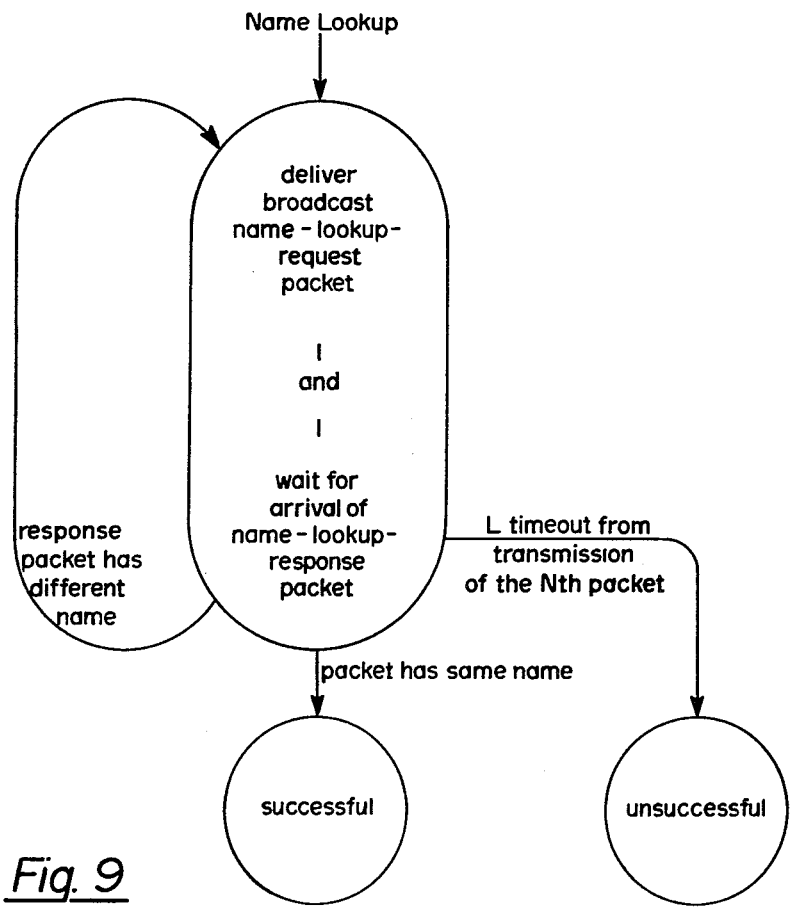
FIG. 9 is a flow diagram of the name-lookup algorithm as employed in the present invention.

A name lookup is accomplished by delivering a broadcast name-lookup-request packet containing the station pathname. A station that receives a name-lookup-request packet containing the name of a process in that station returns a name-lookup-response packet to the sender. The name-lookup-response packet contains the nid of the process and its name. If the sending process receives a name-lookup-response packet with the correct name, the name lookup is successful, and code=1 is returned. If no name-lookup-response packet with the correct name is received within L seconds, then the name lookup is unsuccessful, and code=0 is returned. This algorithm is illustrated in FIG. 9.

If two or more stations contain processes with the same name, then the one that responds first satisfies the name lookup. The nid returned by the name lookup may therefore vary from call to call. A process can have more than one name, and a station may contain more than one server process, each having a different name; i.e., Register can be called more than once.

EPILOGUE

A system and method has been described for the synchronization of variable-length messages being transmitted between stations of a local area contention network where the messages are made up of a variable number of fixed-length packets. This system is adapted for automatic address assignment of different stations of the network so that the network may be expanded or contracted by adding stations and removing stations respectively. In this manner, a very reliable network is provided in that the failure of any particular station does not interfere with the functioning of the other stations in the network or the network itself. In addition, the system includes provision for associating various server stations with a given procedure so that a client station may broadcast a request for a procedure and corresponding server stations will send the response to the client station containing the network identification of the server station. If two or more stations contain the particular procedure called for, the first one to respond to the client station is selected.

While but one embodiment of the present invention has been disclosed, it will be apparent to those skilled in the art that variations and modifications may be made therein without departing from the spirit and the scope of the invention as claimed.

What is claimed is:

1. A station in a communications network including a communications channel for the transmission of packets of information, and a plurality of stations coupled to said channel, said a station comprising:

address selection means for randomly selecting a potential address from a range of permissible addresses;

transmitting means for transmitting an information packet to said selected address so as to test said communications network for possible existence of another station having said selected address; and receiving means for receiving an acknowledgment from said another station;

said address selection means being adapted to randomly select a new potential address if said another station acknowledges receipt of said information packet.

2. A station according to claim 1 further including:

address setting means to set said a station's address to the sum of said selected address and a predetermined number, wherein said predetermined number is the same throughout said communications network.

3. A station according to claim 1 further including:

address setting means to set said a station's address to said selected address when no other station acknowledges receipt of said information packet.

4. A station according to claim 1 further including:

random number selection means to select a random number in a range sufficiently large to insure that the probability of two or more stations selecting the same random number and said selected address is insignificant;

said transmitting means being adapted to transmit an information packet containing said random number to a station having an address which is the sum of said selected address and a predetermined number;

said address selection means being adapted to select a new random address when said another station having said address, which is a said sum, returns an information packet with a number different than said selected random number.

5. A station according to claim 4 further including:

address setting means to set said a station's address to said selected address in the event that no packet is received containing a different random number and that the packet transmitted to said selected address does not receive an acknowledgment.

6. In a station in a communications network including a communications channel for the transmission of packets of information, and a plurality of stations coupled to said channel, the method comprising:
   randomly selecting a potential address from a range of permissible addresses;
   transmitting an information packet to said selected address so as to test said communications network for possible existence of another station having said selected address;
   receiving an acknowledgment from said another station; and
   selecting a new random address if said another station acknowledges receipt of said information packet.

7. A method according to claim 6 further including:
   setting said a station's address to the sum of said selected address and a predetermined number, wherein said predetermined number is the same throughout said communications network.

8. A method according to claim 6 further including:
   setting said a station's address to said selected address when no other station acknowledges receipt of said information packet.

9. A method according to claim 6 further including:
   selecting a random number in a range sufficiently large to insure that the probability of two or more stations selecting the same random number and said selected address is insignificant;
   transmitting an information packet containing said random number to a station having an address which is the sum of said selected address and a predetermined number; and
   selecting a new random address when said another station having said address, which is a said sum, returns an information packet with a number different than said selected random number.

10. A method according to claim 9 further including:
    setting said a station's address to said selected address in the event that no packet is received containing a random number and that the packet transmitted to said selected address does not receive an acknowledgment.

* * * * *